July 18, 1939.   W. L. SCRIBNER   2,166,377
TAPER ROLLER BEARING
Filed May 23, 1938

INVENTOR:
William L. Scribner
by Carr Kent Gravely,
HIS ATTORNEYS.

Patented July 18, 1939

2,166,377

UNITED STATES PATENT OFFICE 2,166,377

TAPER ROLLER BEARING

William L. Scribner, Canton, Ohio, assignor to The Timken Roller Bearing Company, Canton, Ohio, a corporation of Ohio Application May 23, 1938, Serial No. 209,462

5 Claims. (Cl. 308—214)

My invention relates to taper roller bearings and has for its principal object the simplification of such bearings by dispensing with the thrust rib commonly required on one of the bearing members.

The invention consists principally in providing a relatively heavy cage with a flange radially overlapping a portion of one of the bearing members at the small end of its raceway, whereby the end thrust on the rollers is taken up by the engagement of said flange of said cage with said bearing member. The invention further consists in the taper roller bearing and in the parts and combinations and arrangements of parts hereinafter described and claimed.

Figure 1:
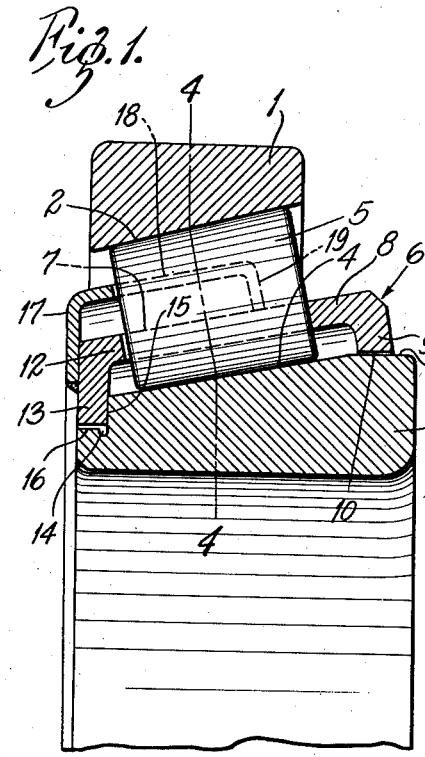
Figure 2:
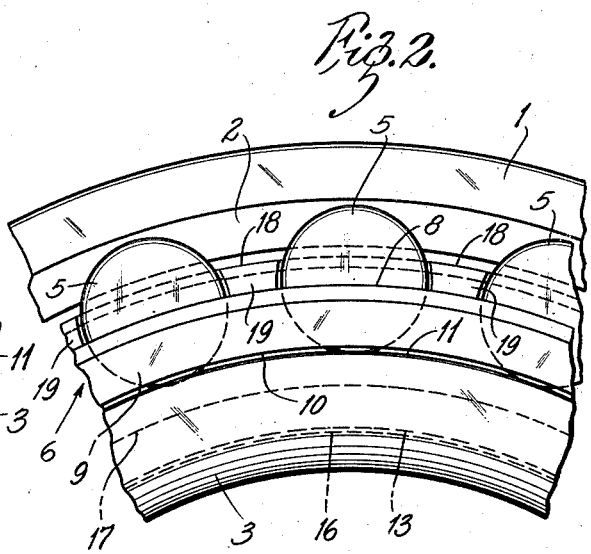
Figure 3:
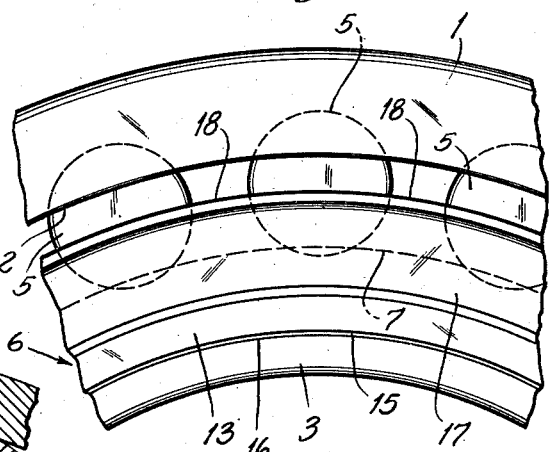
Figure 4:
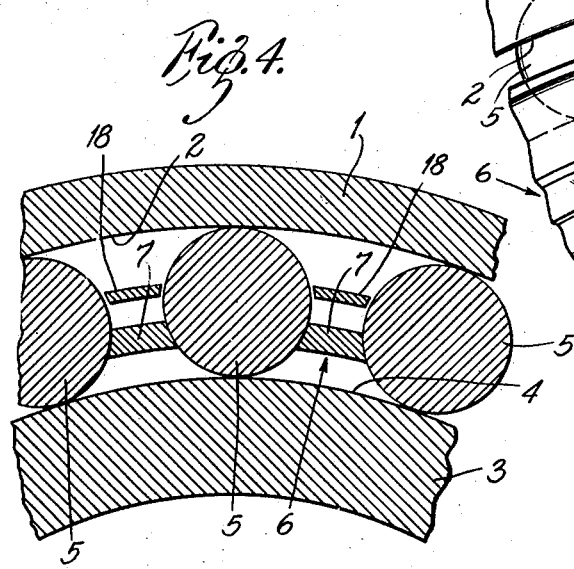

In the accompanying drawing:

Fig. 1 is a longitudinal sectional view of a taper roller bearing embodying my invention, Fig. 2 is a partial end view of the large end of the bearing, Fig. 3 is a partial end view of the small end of the bearing; and Fig. 4 is a sectional view on the line 4—4 in Fig. 1.

The bearing comprises a cup 1 or outer bearing member having a conical raceway 2, a cone 3 or inner bearing member having a conical raceway 4, conical rollers 5 therebetween and a cage, indicated generally by 6, having bridges 7 defining pockets for the individual rollers. The thrust rib commonly provided on one of the bearing members for taking up the end thrust on the conical rollers is dispensed with and a cage construction 6 has been provided which takes up such end thrust.

The cage body 6 is preferably cast of bronze or some other material which has good friction resistant properties in combination with the steel of which the bearing members are made. The conical cage body 6 extends generally parallel to the bearing surface 4 of the bearing cone 3, inwardly of the roller axes, and the large end ring 8 of the cage is engaged by the large ends of the rollers 5. The large end of the cage 6 has an inturned flange 9 which has a cylindrical bore 10 or inner periphery which closely encircles a cylindrical surface 11 of the bearing cone 3 which extends beyond the conical raceway 4.

The small end ring 12 of the cage has an inwardly disposed radial flange 13 which extends into a rabbeted portion 14 at the small end of the bearing cone. The inner face of said radial flange 13 abuts against the radial side wall or face 15 of said rabbeted portion 14 and the cylindrical inner periphery of said flange closely encircles the cylindrical projection 16 formed by said rabbeted portion 14.

In order to make a self-contained assembly of the cage and rollers, a supplemental cage member may be provided, comprising a radial end flange 17 welded or otherwise secured to the radial flange of the cage body, bridges 18 that extend between the rollers radially outwardly of the roller axes and inturned portions 19 that are bent down against the bridges of the main cage 6.

The assembled cage and rollers may be slipped over the bearing cone and the bearing cup then mounted on the rollers. End thrust on the rollers tends to move them toward their large ends and toward the large end of the conical raceway of the bearing cone. This movement due to end thrust on the rollers is taken up by engagement of the inner face of said radial cage flange with the radial face at the small end of the raceway of the bearing cone. The materials of which the cage and cone are made are selected so as to minimize wear and friction as by making the cage of bronze and the bearing cone of steel.

Elimination of the thrust rib usually required for the large end of the rollers reduces the expense of making the bearing and simplifies the construction. At the same time, the cage has ample end thrust resisting capacity for ordinary bearing installations, so that the bearing is entirely satisfactory for any purpose.

Instead of providing the cage with an inturned flange, it may be provided with an outturned flange for cooperation with the bearing cup. The inturned flange at the large end of the cage may be dispensed with and the small end flange may bear directly against the small end of the cone. Numerous other changes may be made without departing from the invention and I do not wish to be limited to the precise construction shown.

What I claim is:

1. A taper roller bearing comprising an inner bearing cone having a conical raceway, conical rollers thereon, an outer bearing cup having a conical raceway and a cage for said rollers having a radially disposed flange at the smaller end of said raceway overlapping a portion of one of said bearing members for taking up end thrust on said rollers, the only contact between said rollers and said bearing members being on the raceways thereof.

2. A taper roller bearing comprising an inner bearing cone having a conical raceway, conical rollers thereon, an outer bearing cup having a conical raceway and a cage for said rollers having a radially disposed flange at the smaller end of said raceway overlapping a portion of said bearing cone for taking up end thrust on said rollers, the only contact between said rollers and said bearing members being on the raceways thereof.

3. A taper roller bearing comprising an inner bearing cone having a radial face at the smaller end of its raceway, and a cylindrical portion extending beyond the larger end of its raceway, conical rollers on said raceway, an outer bearing cup having a conical raceway and a cage for said rollers having an inwardly extending radial flange at one end overlapping said bearing cone and engaging said radial face thereof, and having an inwardly extending radial flange at the other end closely encircling said cylindrical extension of said bearing cone, the only contact between said rollers and said bearing members being on the raceways thereof.

4. A taper roller bearing comprising an inner bearing cone having a rabbeted portion at the smaller end of its raceway, conical rollers thereon, an outer bearing cup having a conical raceway and a cage for said rollers having a radially disposed flange at the smaller end of said raceway extending into said rabbeted portion for taking up end thrust on said rollers, the only contact between said rollers and said bearing members being on the raceways thereof.

5. A taper roller bearing comprising an inner bearing cone having a rabbeted portion at the smaller end of its raceway and a cylindrical portion extending beyond the larger end of its raceway, conical rollers thereon, an outer bearing cup having a conical raceway and a conical cage for said rollers having a radial flange at its larger end closely encircling said cylindrical portion of said bearing cone and a radially disposed flange at the smaller end of said raceway extending into said rabbeted portion of said cone for taking up end thrust on said rollers, the only contact between said rollers and said bearing members being on the raceways thereof.

WILLIAM L. SCRIBNER.